US00RE40523E

(19) United States
(12) Reissued Patent
Miyata et al.

(10) Patent Number: US RE40,523 E
(45) Date of Reissued Patent: Sep. 30, 2008

(54) NON-CONTACT ROTATIONAL POSITION SENSOR AND THROTTLE VALVE ASSEMBLY INCLUDING NON-CONTACT ROTATIONAL POSITION SENSOR

(75) Inventors: Kenji Miyata, Hitachinaka (JP); Satoshi Shimada, Hitachi (JP); Fumio Tajima, Taga-gun (JP); Toshifumi Usui, Tokyo (JP); Masanori Kubota, Hitachinaka (JP)

(73) Assignees: Hitachi, Ltd., Tokyo (JP); Hitachi Car Engineering Co., Ltd., Hitachinaka-shi (JP)

(21) Appl. No.: 10/797,702
(22) Filed: Mar. 10, 2004

Related U.S. Patent Documents

Reissue of:
(64) Patent No.: 6,559,637
Issued: May 6, 2003
Appl. No.: 09/820,327
Filed: Mar. 29, 2001

(30) Foreign Application Priority Data

Jan. 10, 2001 (JP) ..... 2001-002045

(51) Int. Cl.
*G01B 7/30* (2006.01)

(52) U.S. Cl. ..... 324/207.2; 324/207.25; 123/406.52

(58) Field of Classification Search ..... 324/207.2, 324/207.21, 207.25, 207.22, 174; 123/406.52, 123/617
See application file for complete search history.

(56) References Cited

U.S. PATENT DOCUMENTS

| | | | | | |
|---|---|---|---|---|---|
| 4,789,826 | A | * | 12/1988 | Willett | 324/207.2 |
| 5,164,668 | A | | 11/1992 | Alfors | |
| 5,444,369 | A | * | 8/1995 | Luetzow | 324/207.2 |
| 5,528,139 | A | * | 6/1996 | Oudet et al. | 324/207.2 |
| 5,544,000 | A | * | 8/1996 | Suzuki et al. | 361/139 |
| 5,659,246 | A | * | 8/1997 | Togo et al. | 324/207.15 |
| 5,789,917 | A | * | 8/1998 | Oudet et al. | 324/207.2 |
| 6,043,645 | A | * | 3/2000 | Oudet et al. | 324/207.2 |
| 6,137,288 | A | * | 10/2000 | Luetzow | 324/207.2 |
| 6,201,388 | B1 | * | 3/2001 | Pecheny et al. | 324/207.2 |

FOREIGN PATENT DOCUMENTS

| | | | |
|---|---|---|---|
| DE | 199 44 019 | | 3/2000 |
| EP | 0 798 541 | | 10/1997 |
| EP | 0798541 | * | 10/1997 |
| EP | 1 065 473 | | 1/2001 |
| EP | 1065473 A2 | * | 1/2001 |
| JP | 08-126380 | | 5/1996 |
| JP | 2842482 | * | 6/1996 |
| JP | 2920179 | * | 8/1998 |
| JP | 2842482 | * | 10/1998 |
| JP | 2920179 | * | 4/1999 |
| JP | 2000-097606 | | 4/2000 |
| WO | WO 97/43602 | | 11/1997 |

* cited by examiner

*Primary Examiner*—Jay M Patidar
(74) *Attorney, Agent, or Firm*—Crowell & Moring LLP

(57) ABSTRACT

A non-contact sensor for sensing a rotational position of a rotating object is provided. A ring-shaped permanent magnet magnetized in the axial direction is sandwiched between two pairs of magnetic plates from above and below. Two pairs of upper and lower protruded magnetic substance portions are provided between the upper and lower magnetic plates at opposite outer ends thereof. Magnetic sensitive devices are inserted in air gaps between the two pairs of upper and lower protruded magnetic substance portions. A magnetic flux generated from the ring-shaped permanent magnet is substantially concentrated to the protruded magnetic substance portions and passes the magnetic sensitive devices. The amount of magnetic flux passing each magnetic sensitive device is substantially proportional to the rotational angle of the ring-shaped permanent magnet. The rotational position of the ring-shaped permanent magnet and hence the rotational position of a rotating shaft supporting the ring-shaped permanent magnet can be sensed in a non-contact manner as a signal output from the magnetic sensitive device. Since the magnetic flux is effectively concentrated to positions where magnetic sensitive devices are attached, a non-contact rotational position sensor having high accuracy and high sensitivity can be obtained.

21 Claims, 18 Drawing Sheets

NON-CONTACT ROTATIONAL POSITION SENSOR AND THROTTLE VALVE ASSEMBLY INCLUDING NON-CONTACT ROTATIONAL POSITION SENSOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a rotational position sensor for detecting the rotational position of a rotating axis of a throttle valve used in an internal combustion engine, for example, and more particularly to a non-contact rotational position sensor.

The present invention also relates to a throttle valve assembly including the non-contact rotational position sensor.

2. Description of the Related Art

Conventional rotational position sensors of the above-mentioned type are disclosed in Japanese Patent Nos. 2842482 and 2920179 and U.S. Pat. Nos. 5,528,139, 5,789,917 and 6,137,288.

Those prior-art sensors are based on the fact that, taking the permanent magnet side as a rotor, the circumferential magnetic flux density in a stator is linearly distributed relative to the rotating direction of the rotor. To avoid as perfect as possible a magnetic field distribution in the stator from being affected by the rotational position of the rotor to which the magnet is attached, confronting surfaces of the rotor and the stator are shaped such that their lengths are even in a direction perpendicular to the rotating direction of the rotor.

Because of such a limitation imposed on shapes of the confronting surfaces of the rotor and the stator, the conventional rotational position sensors have a problem that flexibility in design is low when the sensors are designed to be adapted for target equipment to which the sensors are attached.

SUMMARY OF THE INVENTION

Accordingly, it is an object of the present invention to provide a non-contact rotational position sensor which is able to operate with satisfactory performance even when confronting surfaces of magnetic paths on the stator side and the rotor side are not shaped such that their lengths are even in a direction perpendicular to the rotor rotating direction.

To achieve the above object, according to one aspect of the present invention, part of a stator-side magnetic path is formed by, e.g., a pair of magnetic plates arranged to sandwich an annular or semi-annular permanent magnet therebetween, which constitutes a rotor. A magnetic flux converging portion serving as a portion to concentrate a magnetic flux is provided midway a closed magnetic path formed through the stator-side magnetic path. A magnetic sensitive device is disposed in the magnetic flux concentrating (converging) portion.

According to another aspect of the present invention, an annular or semi-annular permanent magnet is attached to an end of a rotating shaft of a throttle valve, and a pair of magnetic substance assemblies sandwiching the permanent magnet therebetween to form magnetic paths are attached to a resin cover which is in turn attached to a body of the throttle valve. A magnetic flux converging portion is provided in each of the magnetic substance assemblies, and a magnetic sensitive device is disposed in the magnetic flux converging portion.

More specifically, the annular or semi-annular permanent magnet is detachably attached to the rotating shaft, and at least one of the magnetic substance assemblies has a hole formed at the center thereof and having a diameter greater than a diameter of the rotating shaft, but smaller than an inner diameter of the permanent magnet.

DESCRIPTION OF THE PREFERRED EMBODIMENTS

A first embodiment of the present invention will be described with reference to FIGS. 1 to 4.

Figure 1:
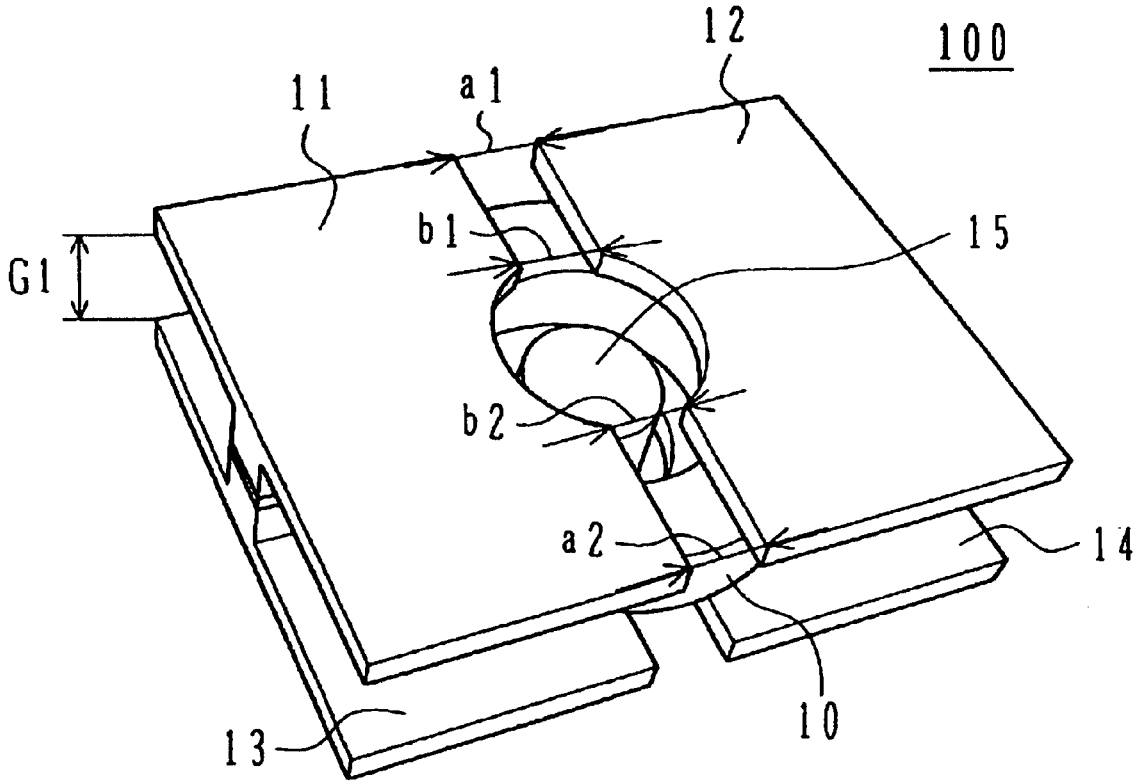
FIG. 1 shows an external appearance of a non-contact rotational position sensor according to a first embodiment of the sent invention.
Figure 2:
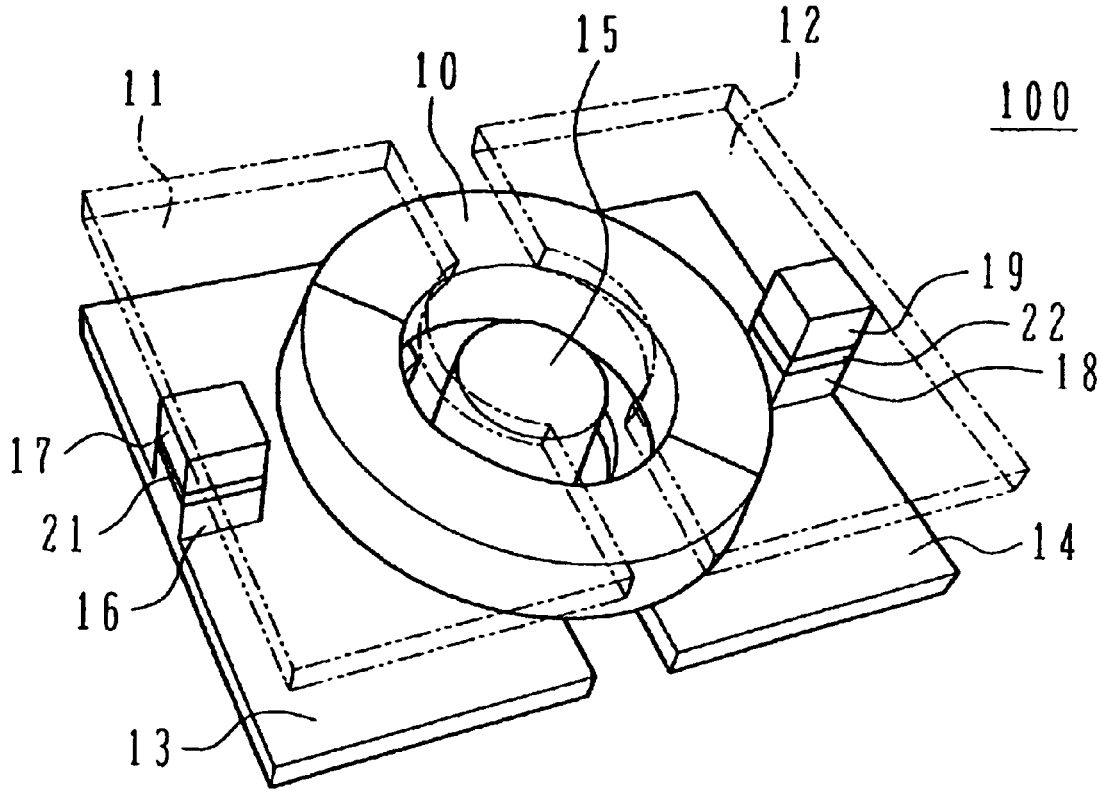
FIG. 2 shows an internal structure of the non-contact rotational position sensor according to the first embodiment of the present invention.

FIG. 1 shows an external appearance of a non-contact rotational position sensor 100 according to this first embodiment, and FIG. 2 shows an internal structure of the sensor. As shown FIGS. 1 and 2, in this embodiment, a rotor comprises a ring-shaped (annular) permanent magnet 10 and a shaft (rotating axis) 15 for supporting the ring-shaped permanent magnet 10. The ring-shaped permanent magnet 10 is sandwiched between vertically spaced pairs of magnetic plates (magnetic substance assemblies) 11, 12, 13 and 14 from above and below.

The magnetic plates 11, 12 are arranged to be apart from each other in the horizontal direction. Air gaps (a1, a2, b1 and b2) are therefore formed between the magnetic plates 11, 12. Also, air gaps are similarly formed between the magnetic plates 13, 14.

The magnetic plates 11, 12, 13 and 14 are provided respectively with protruded magnetic substance portions 16, 17, 18 and 19 that serve as magnetic flux concentrating (converging) portions. A Hall device (magnetic sensitive device) 21 is arranged between the protruded magnetic substance portions 16 and 17, and a Hall device (magnetic sensitive device) 22 is arranged between the protruded magnetic substance portions 18 and 19.

The protruded magnetic substance portions 16, 17, 18 and 19 serving as the magnetic flux concentrating (converging) portions are formed in horizontally symmetrical positions with the air gaps a1, a2, b1 and b2 situated between pairs 16, 18; 17, 19, and they are located at an outer periphery of the magnet 10. While the protruded magnetic substance portions 16, 17, 18 and 19 serving as the magnetic flux concentrating (converging) portions are formed integrally with the magnetic plates 11, 12, 13 and 14 in this embodiment, they may be formed separately and then fixed to the respective magnetic plates by bonding or welding.

Figure 5A:
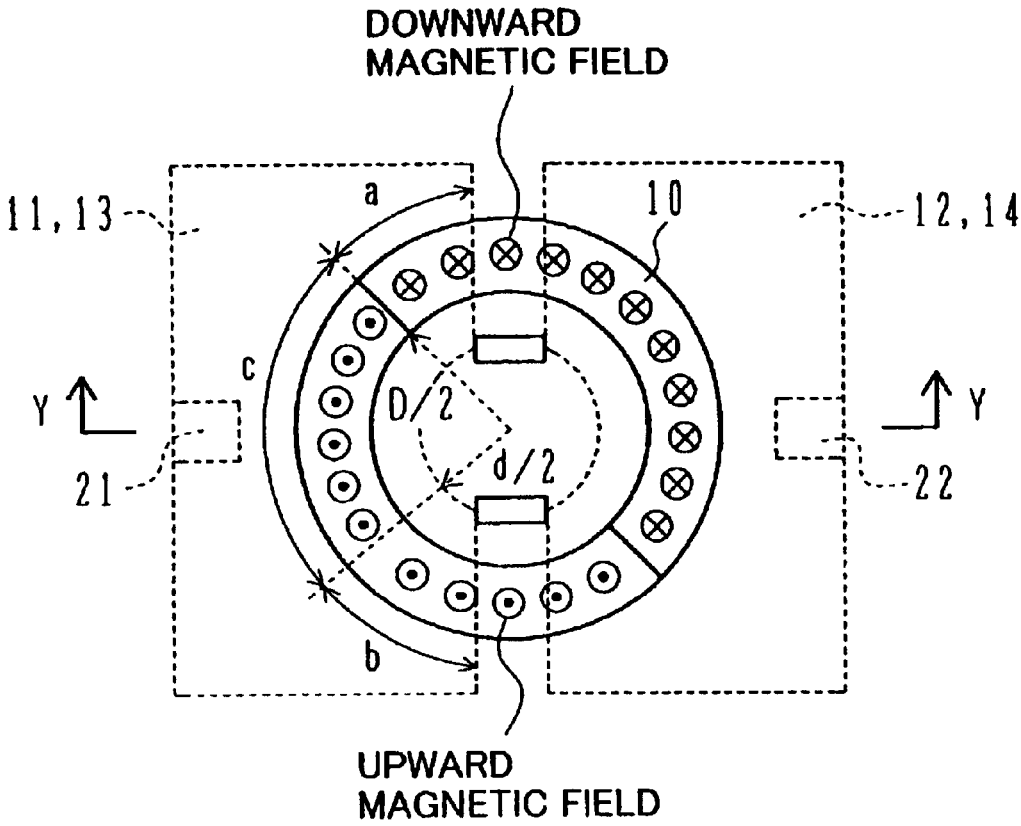
FIG. 5A is a representation for explaining the principle of operation of the non-contact rotational position sensor according to the first embodiment of the present invention.
Figure 5B:
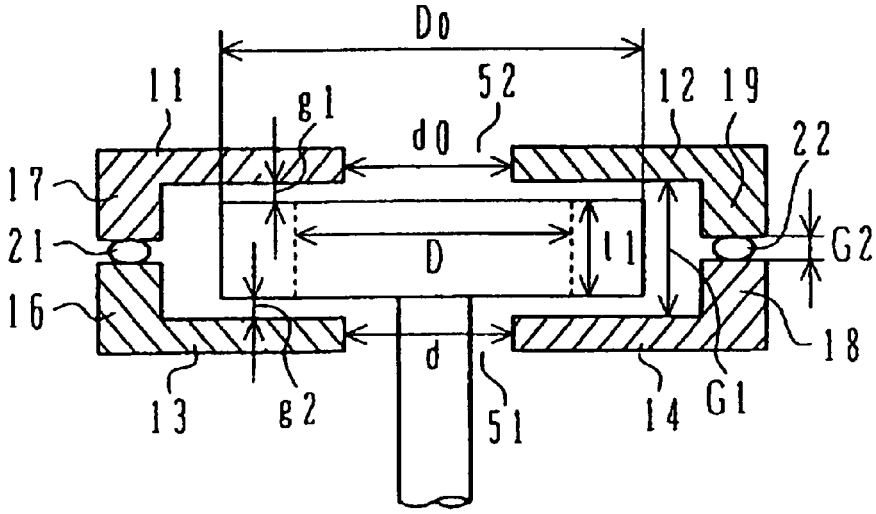
FIG. 5B is a conceptual sectional view taken along line Y—Y in FIG. 5A.

A front view of the non-contact rotational position sensor of this embodiment is shown in FIG. 5B.

The pairs of magnetic plates 11, 13; 12, 14 are arranged to face each other in parallel with a uniform gap G1 left therebetween.

A small gap g1 is formed between the magnetic plates 11, 12 and an upper surface of the magnet 10, and a small gap g2 is formed between the magnetic plates 13, 14 and a lower surface of the magnet 10.

As a result, the gap G1 has a size determined by the sum of a thickness t1 of the magnet 10 and the two small gaps g1, g2.

Also, gaps between one pair of protruded magnetic substance portions 16, 17 and between the other pair 18, 19 are each smaller than the thickness t1 of the magnet 10.

An insertion hole 51 formed at the center of the two magnetic plates 13, 14 for insertion of the shaft 15 therethrough has a diameter d set to be equal to or smaller than an inner diameter D of the magnet 10.

The diameter d of the insertion hole 51 is required to be at least smaller than an outer diameter D0 of the magnet 10, but how small should be the diameter d of the insertion hole 51 is determined depending on conditions of magnetic paths.

Note that a hole 52 at the center of the two magnetic plates 11, 12 and the small gaps a1, a2, b1 and b2 between them may be dispensed with. An embodiment corresponding to such a modification will be described later.

The diameters d, d0 of the holes 51, 52 formed at the centers of the pairs of magnetic plates (11, 12; 13, 14) are determined depending on whether the rotating shaft 15 is utilized as part of the magnetic paths. When the rotating shaft 15 is made of a non-magnetic substance, a noticeable change in performance is not resulted from setting the diameters d, d0 of the holes 51, 52, which are formed at the centers of the pairs of magnetic plates, to be smaller than the inner diameter D of the magnet 10. On the other hand, when the rotating shaft 15 is made of a magnetic substance, the magnetic flux at positions, where the magnetic sensitive devices 21, 22 are attached, is affected by the magnetic flux leaking through the rotating shaft 15. Therefore, the diameters d, d0 of the holes 51, 52 formed at the centers of the pairs of magnetic plates (11, 12; 13, 14) are determined in consideration of such an effect.

In the case of positively utilizing the magnetic flux passing the rotating shaft 15, the diameters d, d0 of the holes 51, 52 formed at the centers of the pairs of magnetic plates (11, 12; 13, 14) are set to smaller values. Conversely, in the case of avoiding an effect of the magnetic flux passing the rotating shaft 15, the diameters d, d0 of the holes 51, 52 formed at the centers of the pairs of magnetic plates (11, 12; 13, 14) are set to larger values. However, if the hole diameters d, d0 are set to be greater than the outer diameter D0 of the magnet 10, air gaps between the magnet 10 and the magnetic plates (11, 12; 13, 14) would be too increased, thus resulting in the reduced amount of basic magnetic flux. For this reason, upper limits of the diameters d, d0 of the holes 51, 52 formed at the centers of the pairs of magnetic plates (11, 12; 13, 14) are each preferably set to the outer diameter D0 of the magnet 10.

By setting the shapes and layouts of the respective magnetic members (11 to 14, 16 to 19, and the rotating shaft) and the dimensional relationships among the gaps (g1, g2, G1 and G2) as described above, the magnetic flux generated from the magnet is concentrated and converged to the two air gaps G2 where the magnetic sensitive devices 21, 22 are attached.

The leakage magnetic path passing the rotating shaft 15 is utilized to adjust the magnetic flux so that extreme saturation of the magnetic flux will not occur at the protruded magnetic substance portions 16, 17, 18 and 19.

Although the non-contact rotational position sensor functions with only one of the Hall devices 21, 22, two Hall devices are disposed in this embodiment for the purpose of backup in the event of a failure or diagnostic check of a failure.

Figure 3:
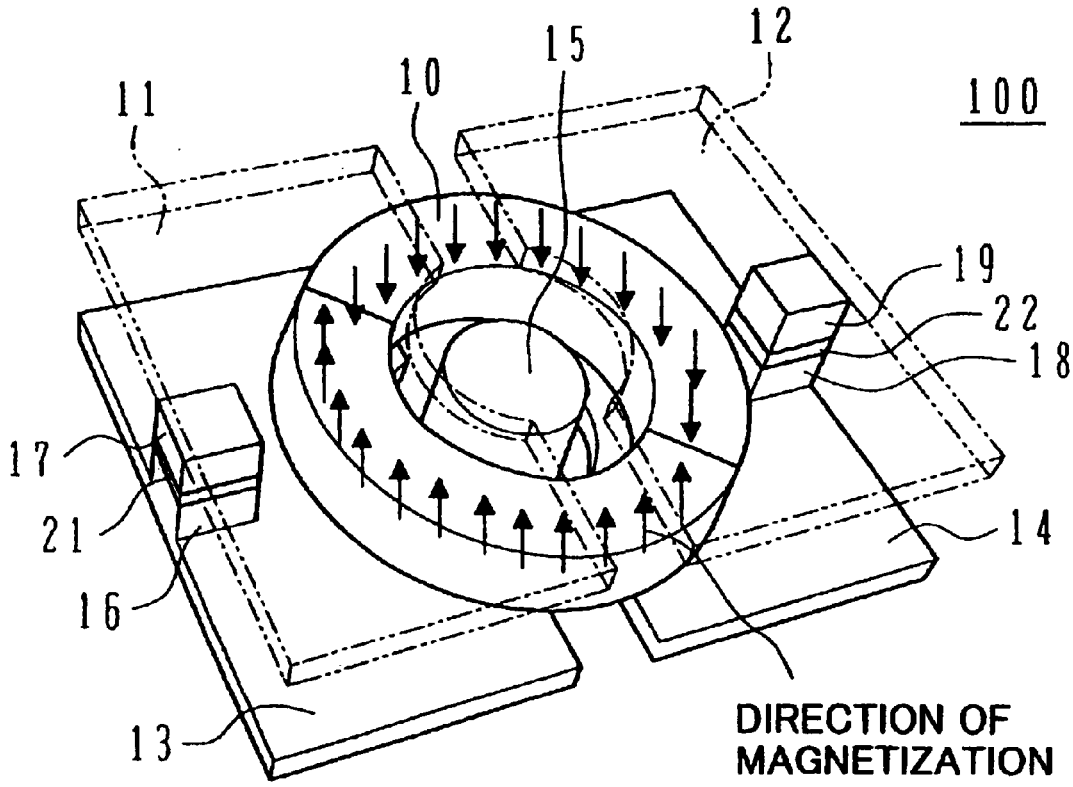
FIG. 3 shows a magnetization distribution of a ring-shaped permanent magnet as one component of the non-contact rotational position sensor according to the first embodiment of the present invention.

As indicated by arrows in FIG. 3, the ring-shaped permanent magnet 10 is magnetized substantially in the axial direction of the rotating shaft. The direction in which the ring-shaped permanent magnet 10 is magnetized is upward in one angular region covering 1800 in the rotating direction, and it is downward in the other angular region.

Figure 4:
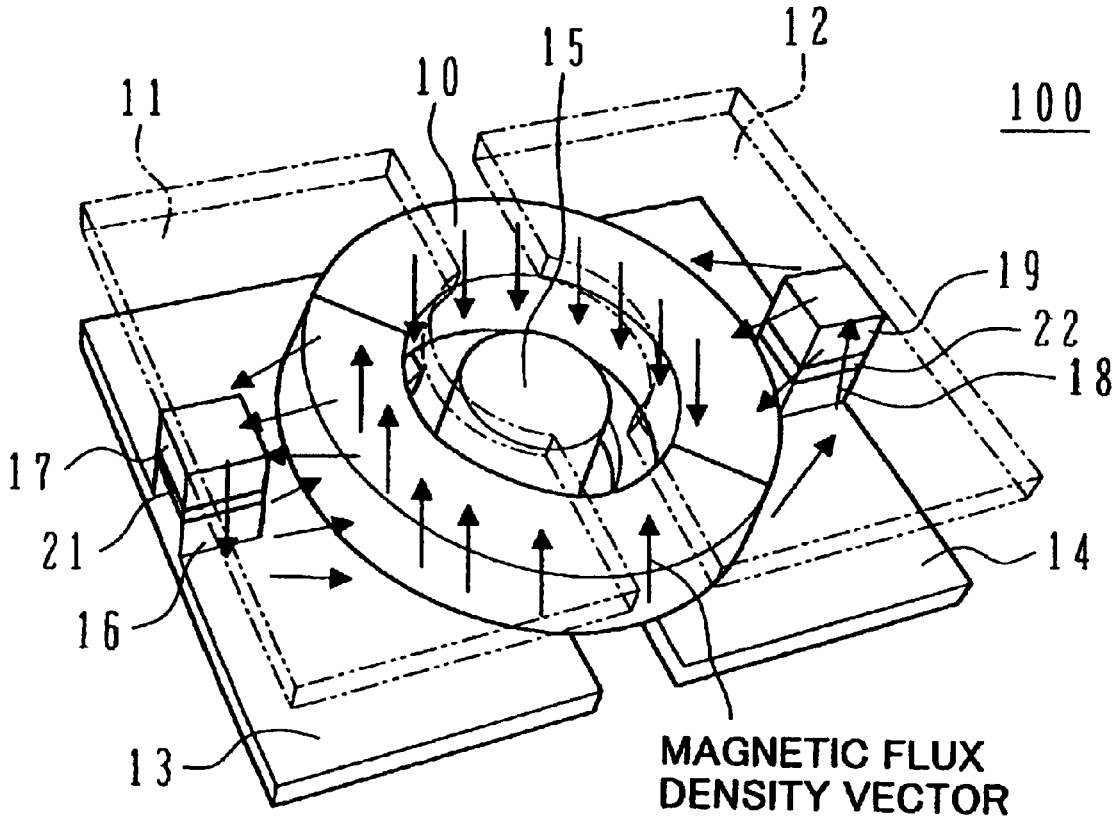
FIG. 4 shows a distribution of magnetic flux density vectors in the non-contact rotational position sensor according to the first embodiment of the present invention.

In this state, magnetic flux density vectors are distributed as schematically shown in FIG. 4. Magnetic fields generated by the ring-shaped permanent magnet 10 are shunted to the upper and lower magnetic plates 11, 12, 13 and 14, and then pass the protruded magnetic substance portions 16, 17, 18 and 19 and the Hall devices 21, 22. The direction and intensity of the magnetic field passing the Hall devices 21, 22 are changed depending on the rotational position of the ring-shaped permanent magnet 10.

The relationship between the rotational position of the ring-shaped permanent magnet 10 and the amount of magnetic flux passing the Hall device 21 will now be described with reference to FIG. 5A. The directions of the magnetic fields generated by the ring-shaped permanent magnet 10 are shown in FIG. 5A.

At the rotational position illustrated, a region a and a region b cover the same circumferential (opening) angle, and the direction of the magnetic fields in these regions are opposite to each other. Therefore, the magnetic flux generated from the region a is canceled by the magnetic flux generated from the region b. Because the magnetization is actually weakened near the boundary between the region a and a region c at which the direction of the magnetization distribution is reversed, the magnetic fluxes from the two regions a and b are not exactly canceled in the strict sense, but they can be regarded as being substantially canceled in the practical point of view.

Accordingly, most of the magnetic flux generated from the remaining region c passes the protruded magnetic substance portions 16, 17. The amount of magnetic flux passing the protruded magnetic substance portions 16, 17 is proportional to the area of the region c.

Also, the area of the region c is proportional to the rotational angle of the ring-shaped permanent magnet 10. The magnetic flux density detected by the Hall device 21 is therefore substantially proportional to the rotational angle of the ring-shaped permanent magnet 10. As a result, by sensing the magnetic flux density detected by the Hall device 21, it is possible to detect the rotational angle of the ring-shaped permanent magnet 10, i.e., the rotational angle of the shaft 15.

In this embodiment, the gaps a1, a2, b1 and b2 between the magnetic plates 11 and 12, shown in FIG. 1 are set to satisfy a1=a2=b1=b2. However, the present invention is not limited to such an arrangement, and the gaps may be set to satisfy a1>b1 and a2>b2. Preferably, the relationships of a1=a2 and b1=b2 are satisfied. Setting the gaps to satisfy a1>b1 and a2>b2 contributes to weakening the magnetic coupling between magnetic plates 11 and 12, and hence to improving linearity in the relationship between the magnetic flux density detected by the Hall device 21 and the rotational angle of the ring-shaped permanent magnet 10.

The pairs of upper and lower magnetic plates 11, 13; 12, 14 are arranged to face each other in parallel with the uniform gap G1 left therebetween. Also, the pairs of upper and lower magnetic plates 11, 13; 12, 14 are arranged to face the permanent magnet 10 such that the uniform gaps g1 (upper gap) and g2 (lower gap) are kept with respect to the upper and lower surfaces of the permanent magnet 10. The gap G1 is greater than the thickness t1 of the permanent magnet 10 by the sum (g+g2) of the gaps g1, g2. On the other hand, a gap g3 between the protruded magnetic substance portions 16, 17 and a gap g4 between the protruded magnetic substance portions 18, 19 are smaller than the thickness t1 of the permanent magnet 10. This arrangement enables the magnetic flux of the permanent magnet 10 to be converged to the protruded magnetic substance portions 16, 17, 18 and 19. From this point of view, the protruded magnetic substance portions 16, 17, 18 and 19 serve as magnetic flux concentrating portions. Thus, the basic principle of the present invention resides in that the protruded magnetic substance portions 16, 17, 18 and 19 are provided between the pairs of magnetic plates 11, 13; 12, 14 to form portions allowing the magnetic flux to easily pass therethrough, whereby the magnetic flux is condensed to those portions.

Considering that the attachment accuracy of each component is on the order of ±0.2 mm when the non-contact rotational position sensor is produced at a low cost, an effect of attachment errors upon characteristics of the sensor can be reduced in this embodiment by setting each of the air gaps between the ring-shaped permanent magnet 10 and the upper and lower magnetic plates 11, 12, 13 and 14 to be not less than 0.5 mm, preferably approximately 1 mm. This point is similarly applied to other embodiments described below.

Magnetic materials have varying degrees of magnetic hysteresis characteristic. Generally, when the degree of magnetic hysteresis exceeds 0.5 T or 1 T, the magnetic hysteresis effect becomes noticeable in a gradually increasing manner. To obtain a high accuracy in detection of the rotational position sensor, therefore, it is preferable that the magnetic hysteresis is held in a range as small as possible in operation of the sensor. For this reason, the magnetic flux density in magnetic materials, typically represented by the magnetic plates 11, 12, 13 and 14, is preferably held to be not higher than 0.5 T. This point is also similarly applied to the other embodiments described below.

Note that the permanent magnet is described as being ring-shaped in this embodiment, similar functions can be provided even with a disk-shaped permanent magnet.

Figure 6:
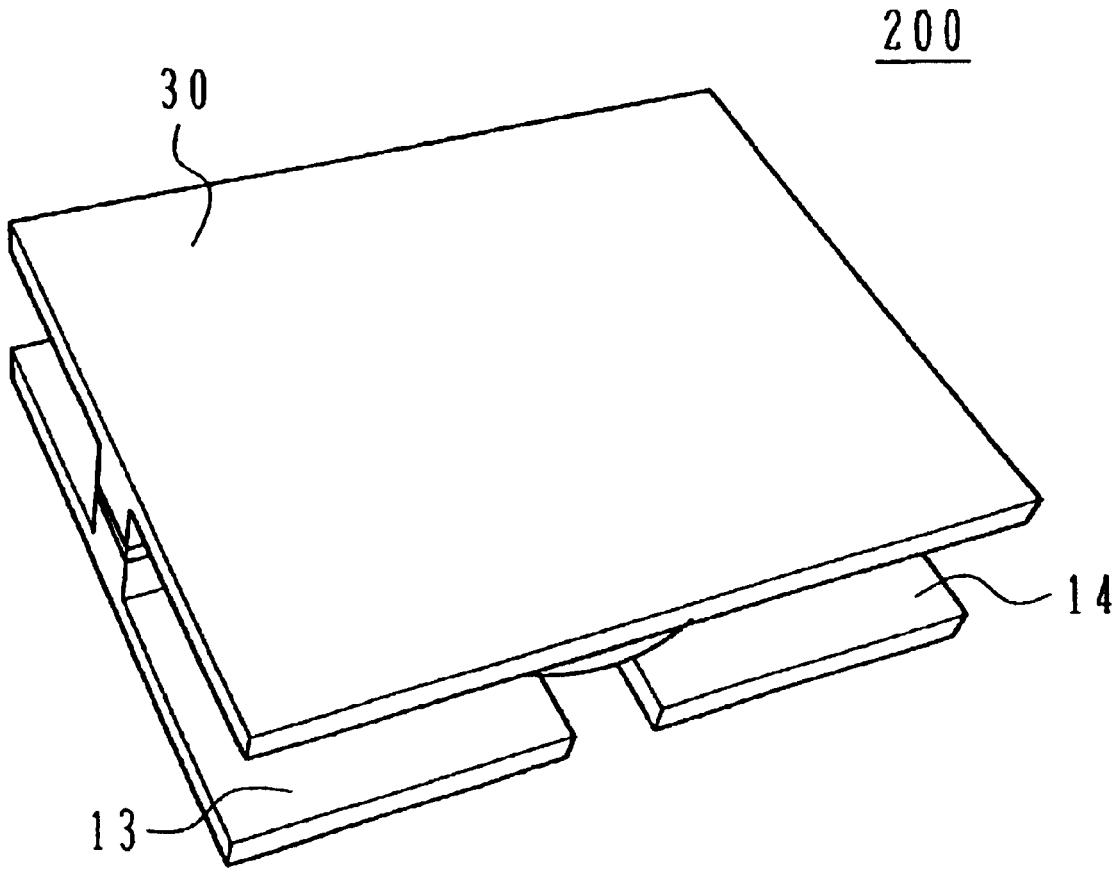
FIG. 6 shows an external appearance of a non-contact rotational position sensor according to a second embodiment of the present invention.
Figure 7:
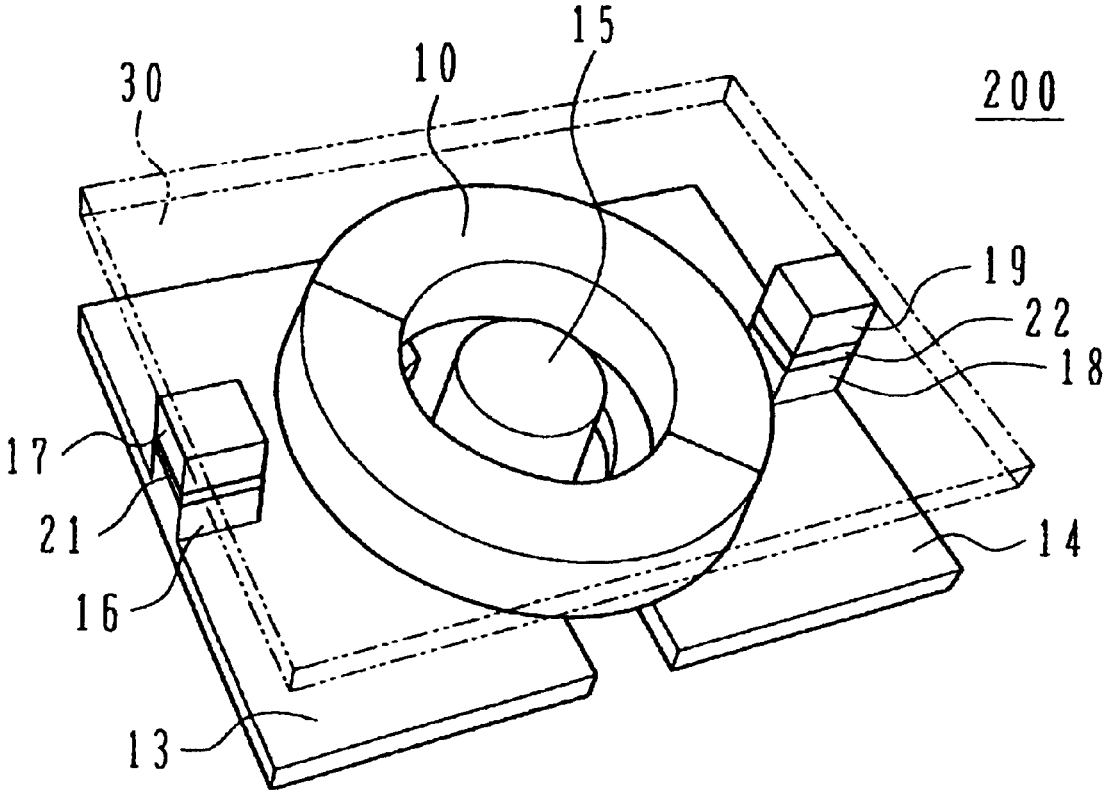
FIG. 7 shows an internal structure of the non-contact rotational position sensor according to the second embodiment of the present invention.
Figure 8:
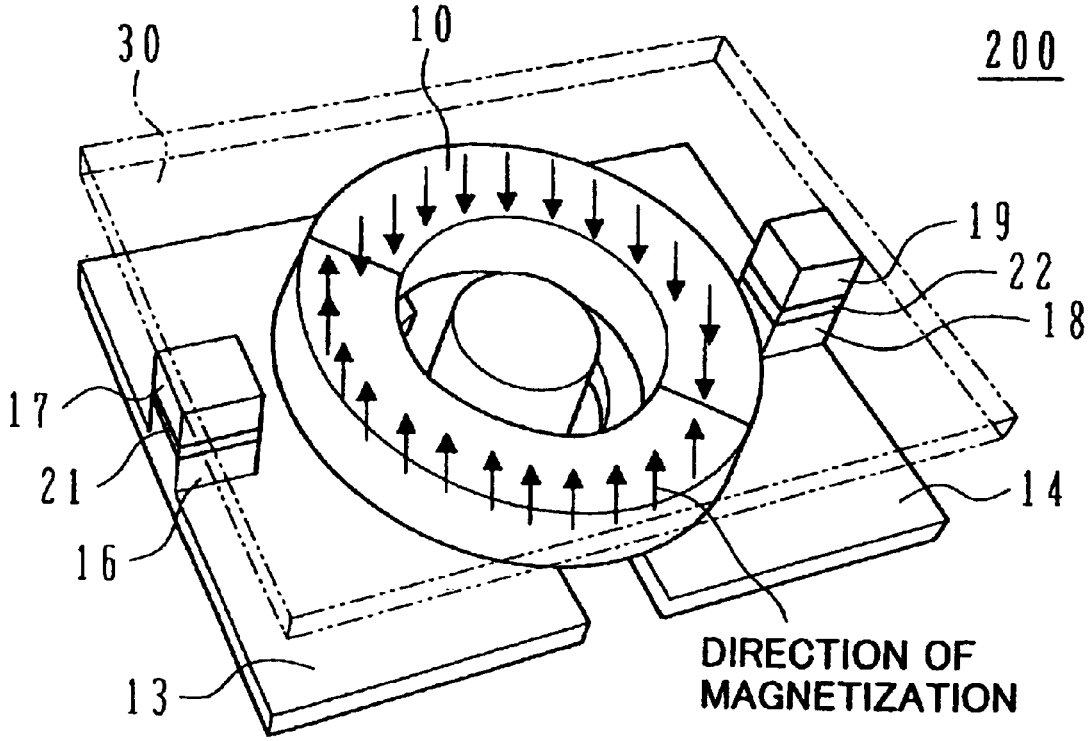
FIG. 8 shows a magnetization distribution of a ring-shaped permanent magnet as one component of the non-contact rotational position sensor according to the second embodiment of the present invention.
Figure 9:
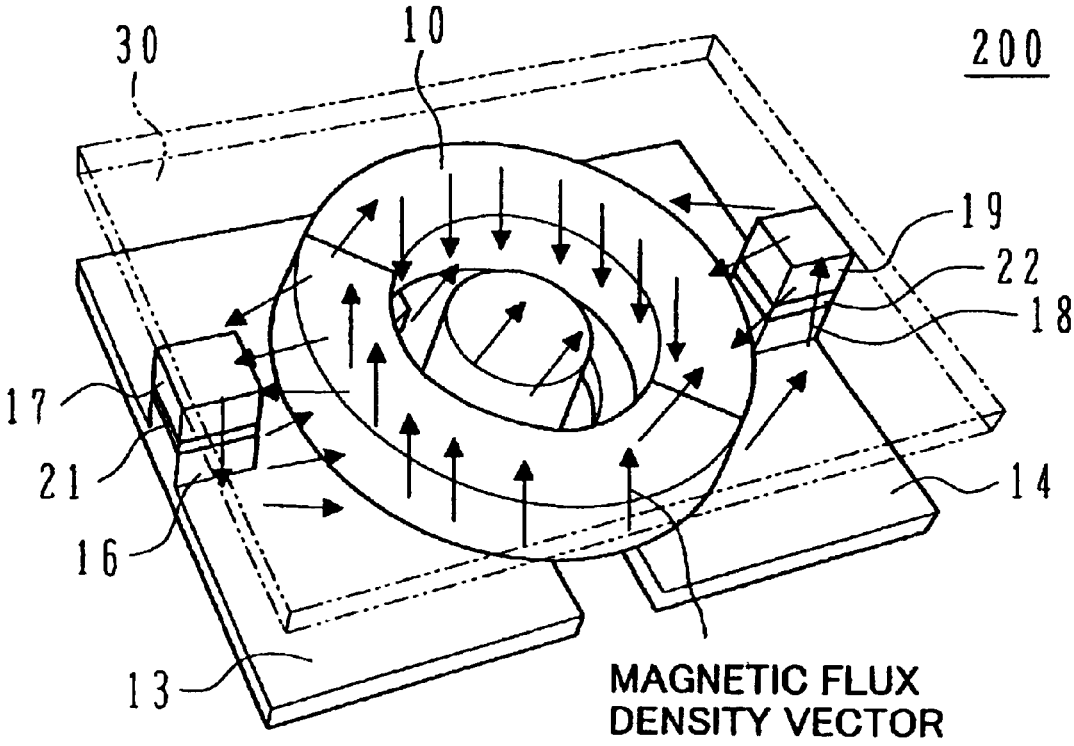
FIG. 9 shows a distribution of magnetic flux density vectors in the non-contact rotational position sensor according to the second embodiment of the present invention.

A second embodiment of the present invention will be described with reference to FIGS. 6 to 9. FIG. 6 shows an external appearance of a non-contact rotational position sensor 200 according to this second embodiment, and FIG. 7 shows an internal structure of the sensor. As shown FIGS. 6 and 7, the sensor of this second embodiment is of basically the same structure as that of the above first embodiment except that an magnetic plate 30 is formed of one piece of magnetic plate. In order to branch and shunt the magnetic flux generated from the ring-shaped permanent magnet 10 to the protruded magnetic substance portions 16, 17 and the protruded magnetic substance portions 18, 19, it is just required tat the horizontal gaps are formed in at least one of the upper and lower magnetic plates. In this embodiment, the horizontal gaps are formed between the lower magnetic plates 13 and 14. FIG. 8 shows a magnetization distribution of the ring-shaped permanent magnet 10, and FIG. 9 shows a distribution of magnetic flux density vectors.

In this embodiment, a magnetic path is formed above the ring-shaped permanent magnet 10, and therefore the amounts of magnetic flux shunted to the protruded magnetic substance portions 16, 17 and the protruded magnetic substance portions 18, 19 are somewhat reduced. This embodiment however has advantages that, because of employing one piece of upper magnetic plate 30, the number of parts is reduced and the rotational position sensor can be manufactured with more ease. Further, when the rotational position sensor is attached at its lower surface to a target apparatus, an upper surface of the sensor is faced to the outside. In such a case, this embodiment provides another advantage of reducing an effect upon a sensor output caused when any magnetic substance enters the sensor from the outside.

Figure 10:
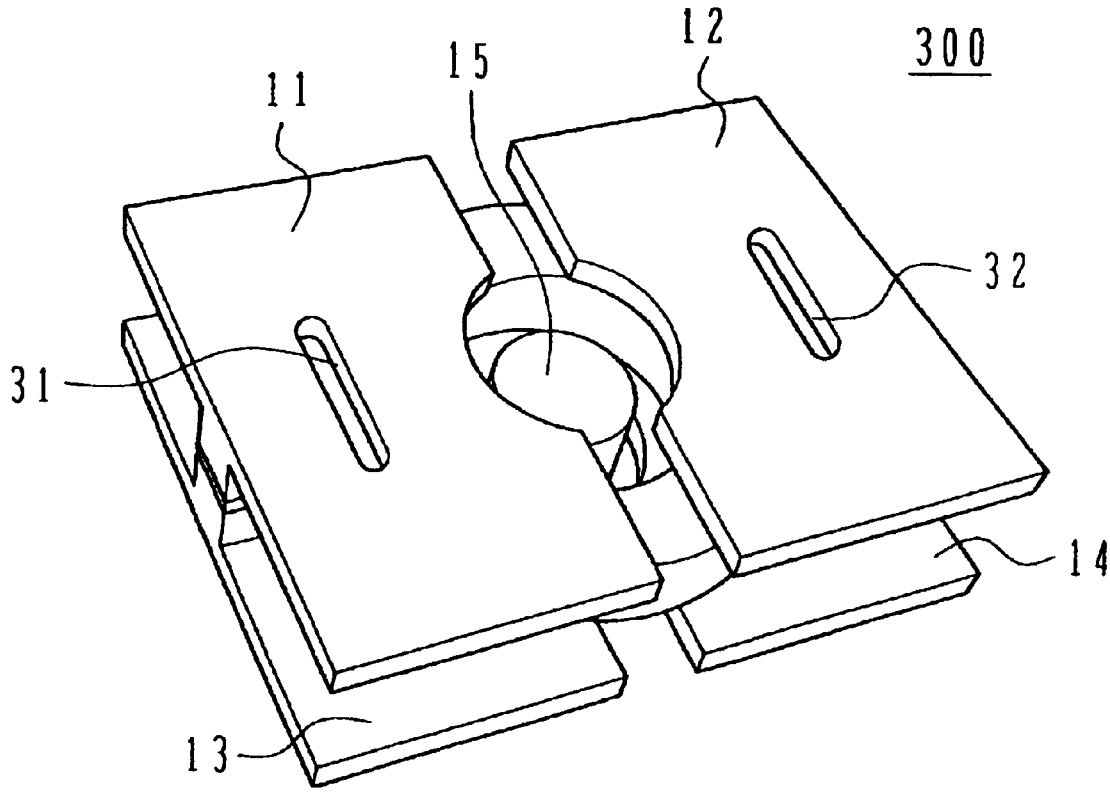
FIG. 10 shows an external appearance of a non-contact rotational position sensor according to a third embodiment of the present invention.

FIG. 10 shows a third embodiment of the present invention. A non-contact rotational position sensor 300 of this third embodiment is modified from the structure of the above first embodiment in that holes 31, 32 are formed respectively in the magnetic plates 11, 12. Magnetic resistance distributions in magnetic paths formed in the magnetic plates 11, 12 can be adjusted depending on shapes and sizes of the holes 31, 32. This arrangement is effective in improving linearity in the relationship between the magnetic flux density detected by the Hall device and the rotational angle of the ring-shaped permanent magnet as compared with that in the rotational position sensor of the above first embodiment. It is also possible to further improve the linearity by forming similar holes in the magnetic plates 13, 14 as well. While one hole is formed in each magnetic plate in this embodiment, the present invention is not limited to such an arrangement, and two or more holes may be formed in each magnetic plate. This point is similarly applied to the other embodiments described below.

Figure 11:
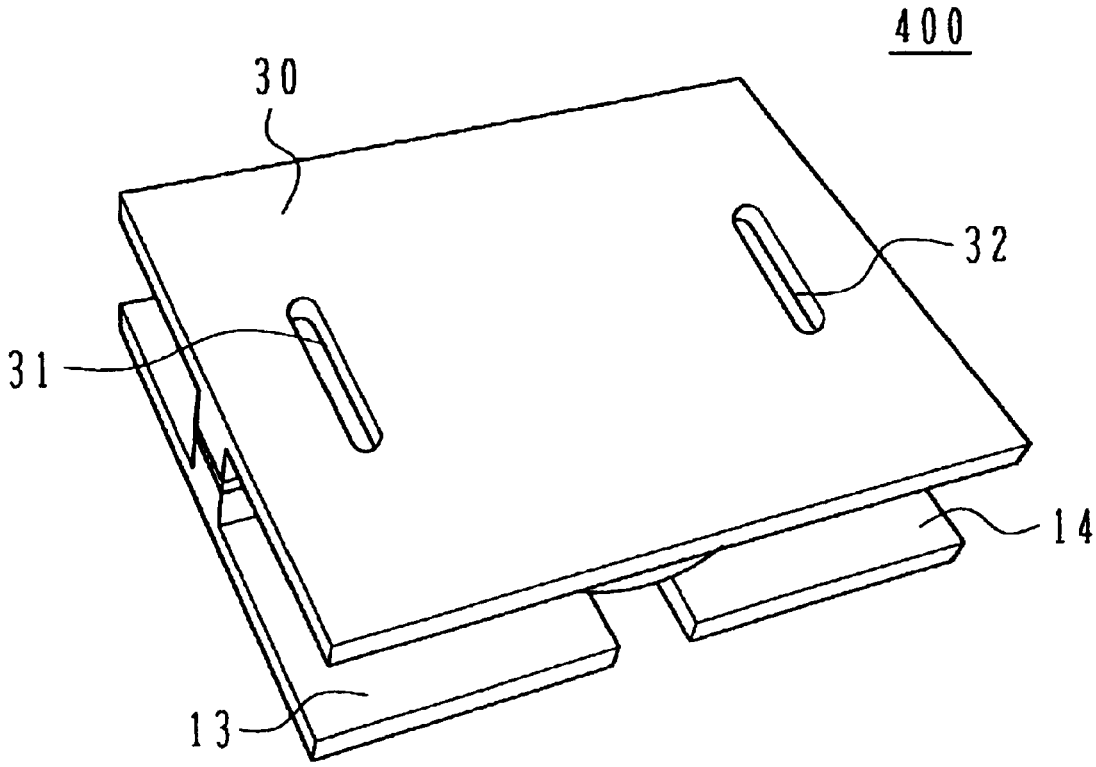
FIG. 11 shows an external appearance of a non-contact rotational position sensor according to a fourth embodiment of the present invention.

FIG. 11 shows a fourth embodiment of the present invention. A non-contact rotational position sensor 400 of this fourth embodiment is modified from the structure of the above second embodiment in that holes 31, 32 are formed in the magnetic plate 30. This arrangement is effective in improving linearity in the relationship between the magnetic flux density detected by the Hall device and the rotational angle of the ring-shaped permanent magnet as compared with that in the rotational position sensor of the above second embodiment.

Figure 12:
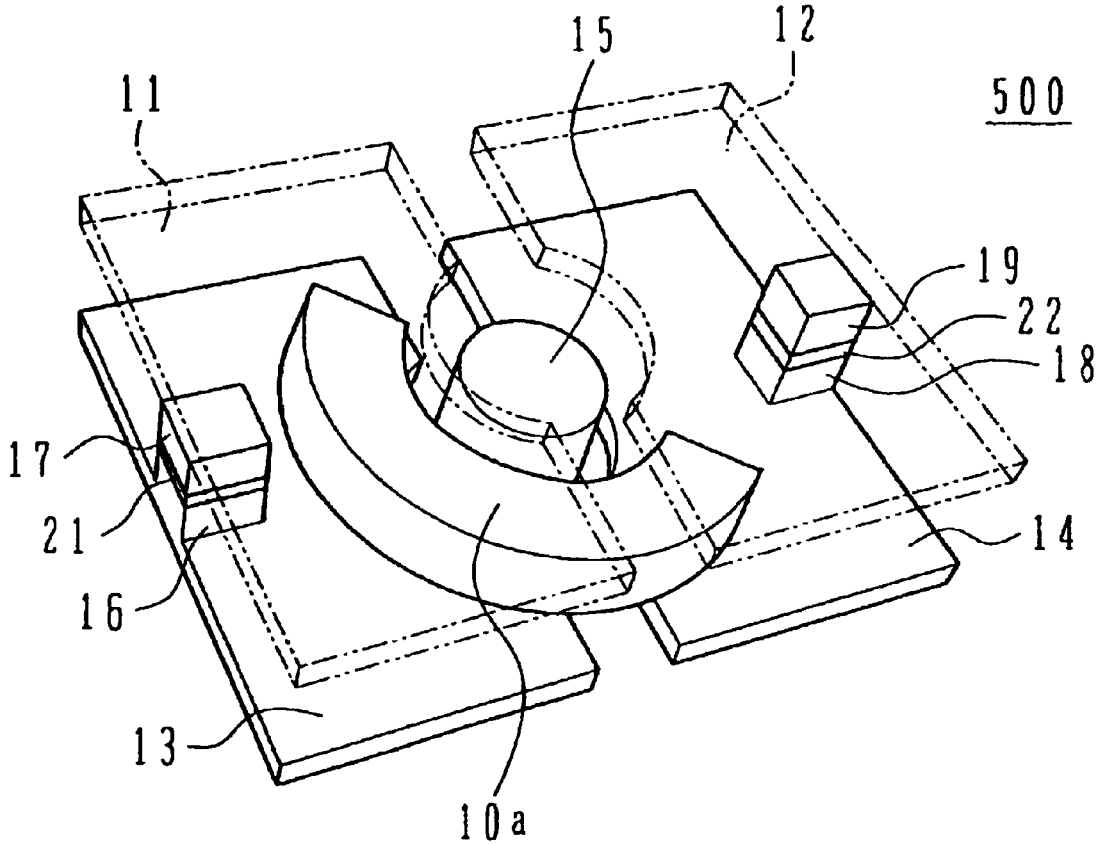
FIG. 12 shows an internal structure of a non-contact rotational position sensor according to a fifth embodiment of the present invention.

FIG. 12 shows a fifth embodiment of the present invention. A non-contact rotational position sensor 500 of this fifth embodiment is modified from the structure of the above first embodiment in that the ring-shaped permanent magnet 10 magnetized into a double-pole magnet, shown in FIG. 2, is replaced by a single-pole permanent magnet 10a in the form split into a semi-ring. The permanent magnet 10a is magnetized upward or downward parallel to the axial direction of the rotating shaft. In this case, the magnetic flux entering the magnetic plate 11 is substantially proportional to the area of a vertically projected surface of the permanent magnet 10a upon the magnetic plate 11, and the vertically projected surface area of the permanent magnet 10a is proportional to the rotational angle thereof. The magnetic flux density detected by the Hall device 21 is therefore proportional to the rotational angle of the permanent magnet 10a. As a result, by sensing the magnetic flux density detected by the Hall device 21, it is possible to detect the rotational angle of the permanent magnet 10a, i.e., the rotational angle of the shaft 15.

Figure 13:
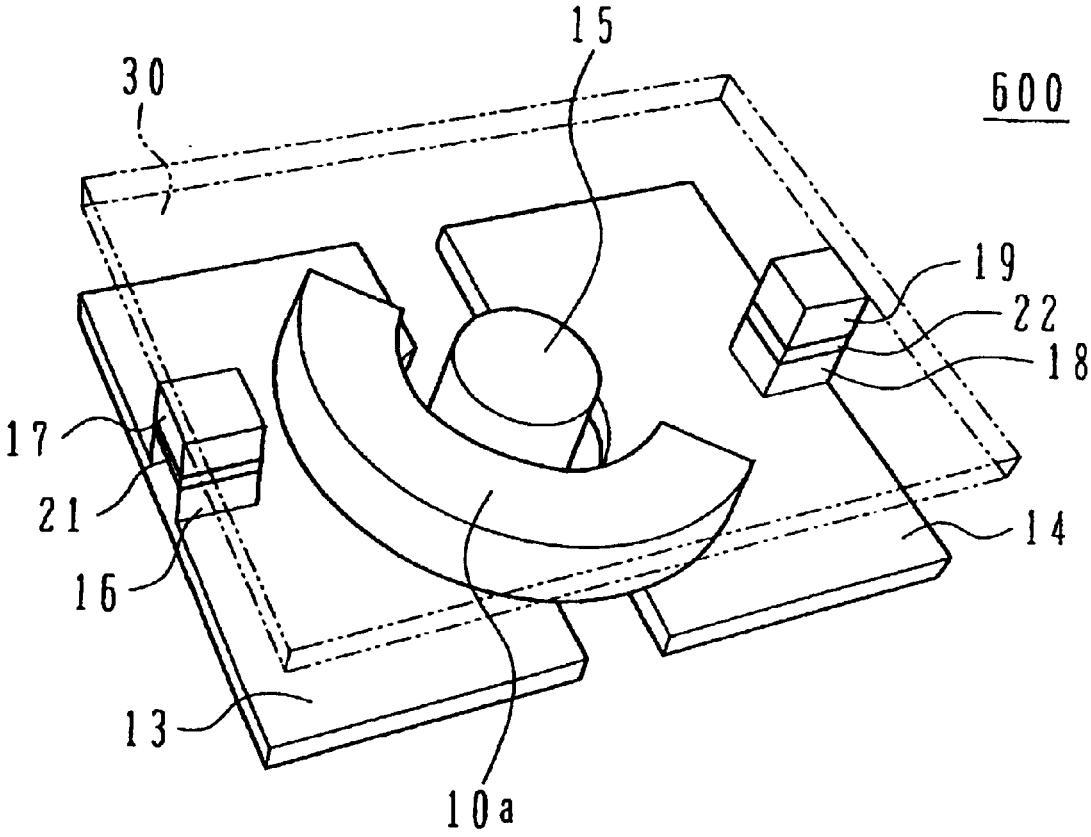
FIG. 13 shows an internal structure of a non-contact rotational position sensor according to a sixth embodiment of the present invention.

FIG. 13 shows a sixth embodiment of the present invention. A non-contact rotational position sensor 600 of this sixth embodiment is modified from the structure of the above second embodiment in that the ring-shaped permanent magnet 10 magnetized into a double-pole magnet, shown in FIG. 7, is replaced by a single-pole permanent magnet 10a in the form split into a semi-ring. The magnetic flux generated from the permanent magnet 10a enters the magnetic plate 30 and is then shunted to the protruded magnetic substance portions 17, 19. After passing the Hall devices 21, 22 and the protruded magnetic substance portions 16, 18, the magnetic fluxes enter the magnetic plates 13, 14 and then return to the permanent magnet 10a, whereby magnetic path loops are formed. A distribution ratio between the magnetic fluxes shunted to the protruded magnetic substance portions 17, 19 is substantially determined by a ratio of the area of a vertically projected surface of the permanent magnet 10a upon the magnetic plate 13 to the area of a vertically projected surface of the permanent magnet 10a upon the magnetic plate 14. The magnetic flux density detected by the Hall device 21 is therefore proportional to the rotational angle of the permanent magnet 10a. As a result, by sensing the magnetic flux density detected by the Hall device 21, it is possible to detect the rotational angle of the permanent magnet 10a which is a circular arc in shape, i.e., the rotational angle of the shaft 15.

Figure 14:
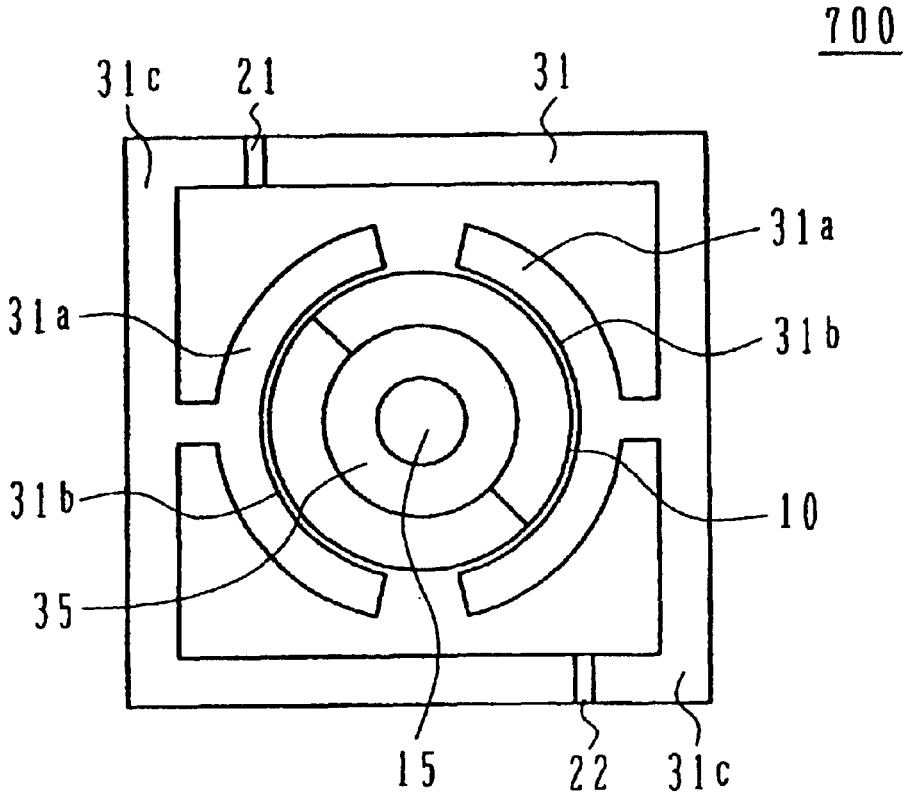
FIG. 14 shows an internal structure of a non-contact rotational position sensor according to a seventh embodiment of the present invention.

FIG. 14 shows a seventh embodiment of the present invention. In a non-contact rotational position sensor 700 of this seventh embodiment, a rotor comprises a ring-shaped permanent magnet 10, a magnetic yoke 35, and a shaft 15 for supporting the ring-shaped permanent magnet 10. A stator comprises magnetic plates 31 surrounding the ring-shaped permanent magnet 10 from the outer side, and Hall devices 21, 22 inserted in gaps between the magnetic plates 31. The ring-shaped permanent magnet 10 is magnetized in the radial direction, and looking round an outer circumferential surface of the ring-shaped permanent magnet 10, it is magnetized into a double-pole magnet. More specifically, the ring-shaped permanent magnet 10 is magnetized outward in the radial direction in one circumferential region of 180°, and magnetized inward in the radial direction in the other circumferential region. Magnetic plates sub-members 31a of the magnetic plates 31, which form magnetic poles closest to the rotor, serve to collect the magnetic flux generated from the ring-shaped permanent magnet 10, and magnetic field distribution in the magnetic plate sub-members 31a do not directly affect signal outputs of the Hall devices 21, 22. Therefore, shapes of surfaces 31b of the magnetic plate sub-members 31a directly facing the ring-shaped permanent magnet 10 are not required to be even in the rotating direction of the ring-shaped permanent magnet 10. The magnetic flux collected by the magnetic plate sub-member 31a of one magnetic plate 31 passes an associated magnetic plate sub-member 31c and then the Hall device 21. Thereafter, the magnetic flux passes a magnetic plate sub-member 31c and the magnetic plate sub-member 31a of the other magnetic plate 31, and is then returned to the ring-shaped permanent magnet 10. While the magnetic plate sub-member 31a and the magnetic plate sub-member 31c are arranged on the same plane in this embodiment, the present invention is not limited to such an arrangement. Looking FIG. 14 from the observer side, the magnetic plate sub-member 31c may be arranged on the front or rear side of the ring-shaped permanent magnet 10 so as to provide a three-dimensional structure.

Figure 15:
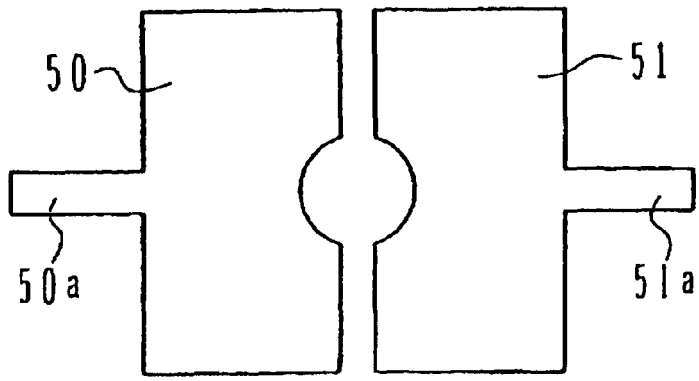
FIG. 15 shows shapes of magnetic plates before machining, which are used in a non-contact rotational position sensor according to an eighth embodiment of the present invention.
Figure 16:
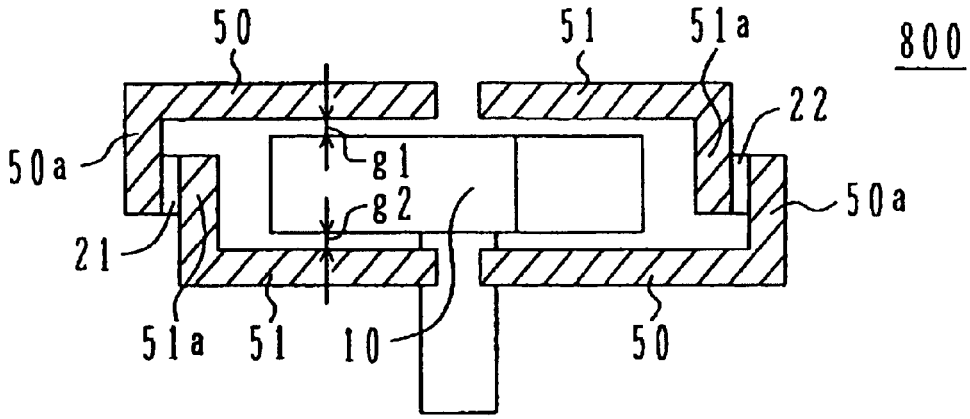
FIG. 16 shows an internal structure of the non-contact rotational position sensor according to the eighth embodiment of the present invention.

FIG. 16 shows an eighth embodiment of the present invention. A non-contact rotational position sensor 800 of this eighth embodiment differs from that of the above first embodiment in that two pairs of magnetic plates 50, 51 having protruded portions 50a, 51a, shown in FIG. 15, are employed instead of the magnetic plates 11, 12, 13 and 14 and the protruded magnetic substance portions 16, 17, 18 and 19, the protruded portions 50a, 51a being bent substantially vertical to planes of the magnetic plates 50, 51. A ring-shaped permanent magnet 10 is sandwiched between the vertically spaced magnetic plates 50, 51 from above and below as shown in FIG. 16. On that occasion, Hall devices 21, 22 are held between the protruded portions 50a, 51a of the magnetic plates 50, 51. Magnetic paths substantially equivalent to those in the above first embodiment were thereby formed to provide the function of a non-contact rotational position sensor. According to this eighth embodiment, since punching of the magnetic plates 50, 51 and bending of the protruded portions 50a, 51a are just required, the productivity can be increased as compared with the above first embodiment in which the protruded magnetic substance portions 16, 17, 18 and 19 are provided on the magnetic plates 11, 12, 13 and 14.

Figure 17:
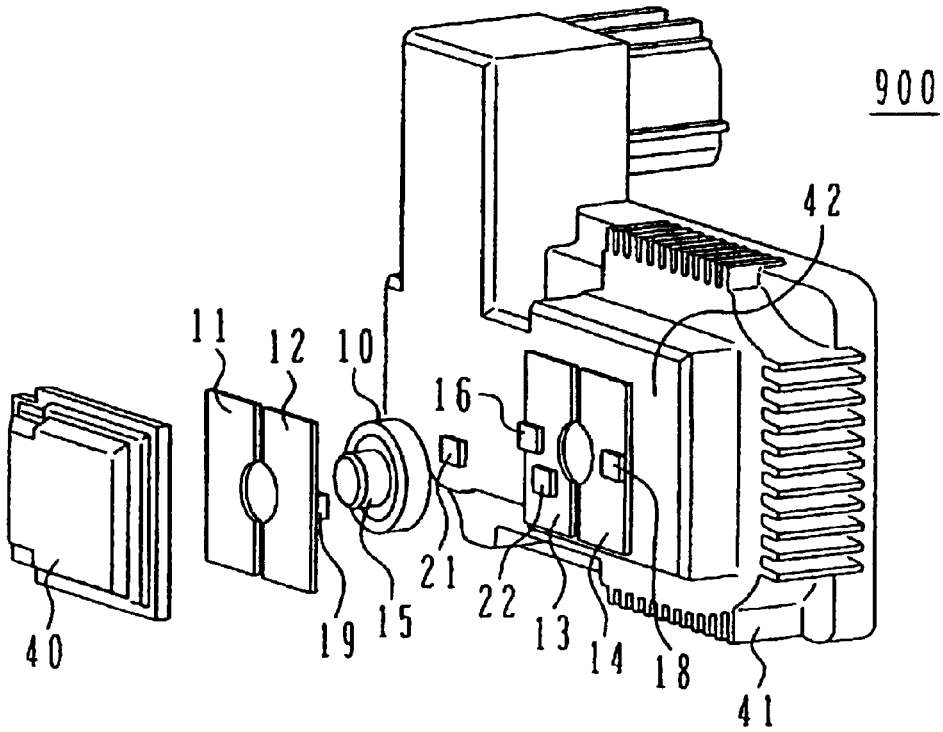
FIG. 17 shows an internal structure of a non-contact rotational position sensor according to a ninth embodiment of the present invention in a state of being attached to an actual apparatus.

A description will now be made of a ninth embodiment in which the first embodiment of the present invention is applied to an actual apparatus. Referring to FIG. 17, a rotating-axis penetrating hole 42, through which a rotating axis is to be extended to the outside, is formed in a housing cover 41 of a target apparatus for which a rotational angle is to be detected. The magnetic plates 13, 14, including the protruded magnetic substance portions 16, 18 provided thereon, and the Hall devices 21, 22 are mounted onto an outer surface of the housing cover 41. An integral assembly of the ring-shaped permanent magnet 10 and the shaft 15 is coupled to the rotating axis of the target apparatus. Another integral unit of the magnetic plates 11, 12 and a housing cover 40 of a rotational position sensor 900 is then attached to the outer side of the above integral unit. As a method of integrating the magnetic plates 11, 12 and the housing cover 40 of the rotational position sensor 900 into a one-piece unit, the so-called insert molding is superior in productivity. With this method, the housing cover 40 is made of a resin, for example, and the resin is molded into the housing cover 40 with the magnetic plates 11, 12 embedded therein.

In the above-described embodiments, the magnetic plates 11, 12, 13, 14 and 30 are illustrated as being rectangular plates. However, the magnetic plates for use in the present invention are not limited to a rectangular shape, but may have any of other suitable shapes such as a disk, semi-disk, sector, and a trapezoid.

Figure 18:
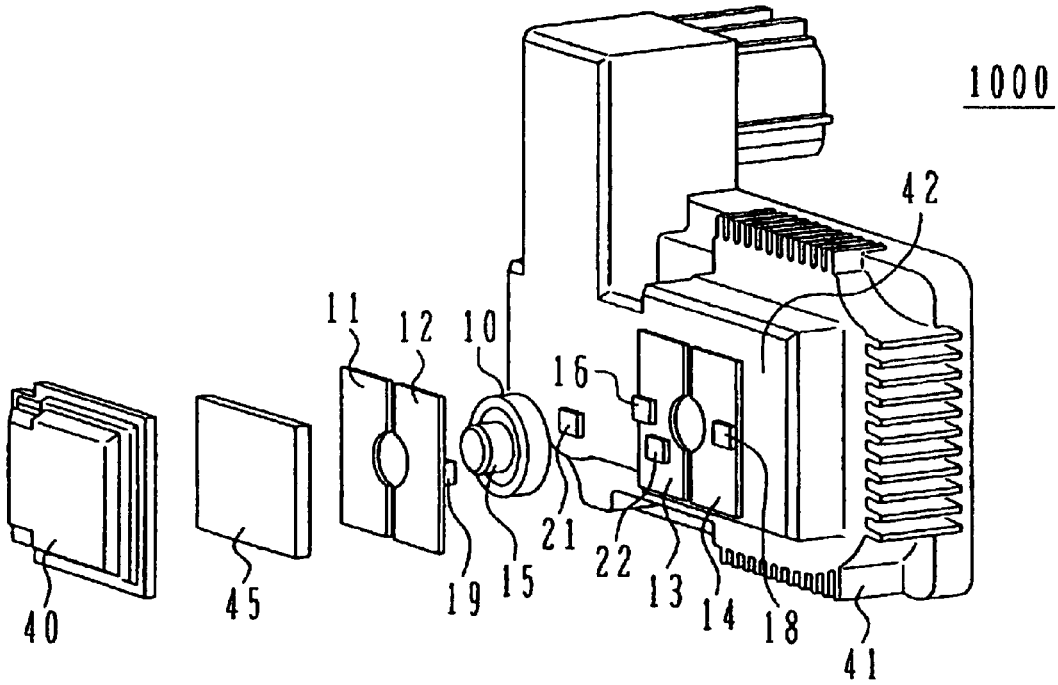
FIG. 18 shows an internal structure of a non-contact rotational position sensor according to a tenth embodiment of the present invention in a state of being attached to an actual apparatus.

There are various non-contact rotational position sensors using permanent magnets, including the sensor of the present invention. When those non-contact rotational position sensors are assembled in target apparatus, there is a possibility that any magnetic substance may exist in the vicinity of the assembled non-contact rotational position sensors. In such a case, an output signal of a magnetic sensitive device, such as a Hall device, is adversely affected by the presence of a magnetic substance. In a tenth embodiment, therefore, a shield cover 45 provided with a magnetic substance is attached to a housing cover 40 of a non-contact rotational position sensor 1000, as shown in FIG. 18. This arrangement is advantageous in reducing an effect of any external magnetic substance upon an output signal of a magnetic sensitive device, such as a Hall device.

Figure 19:
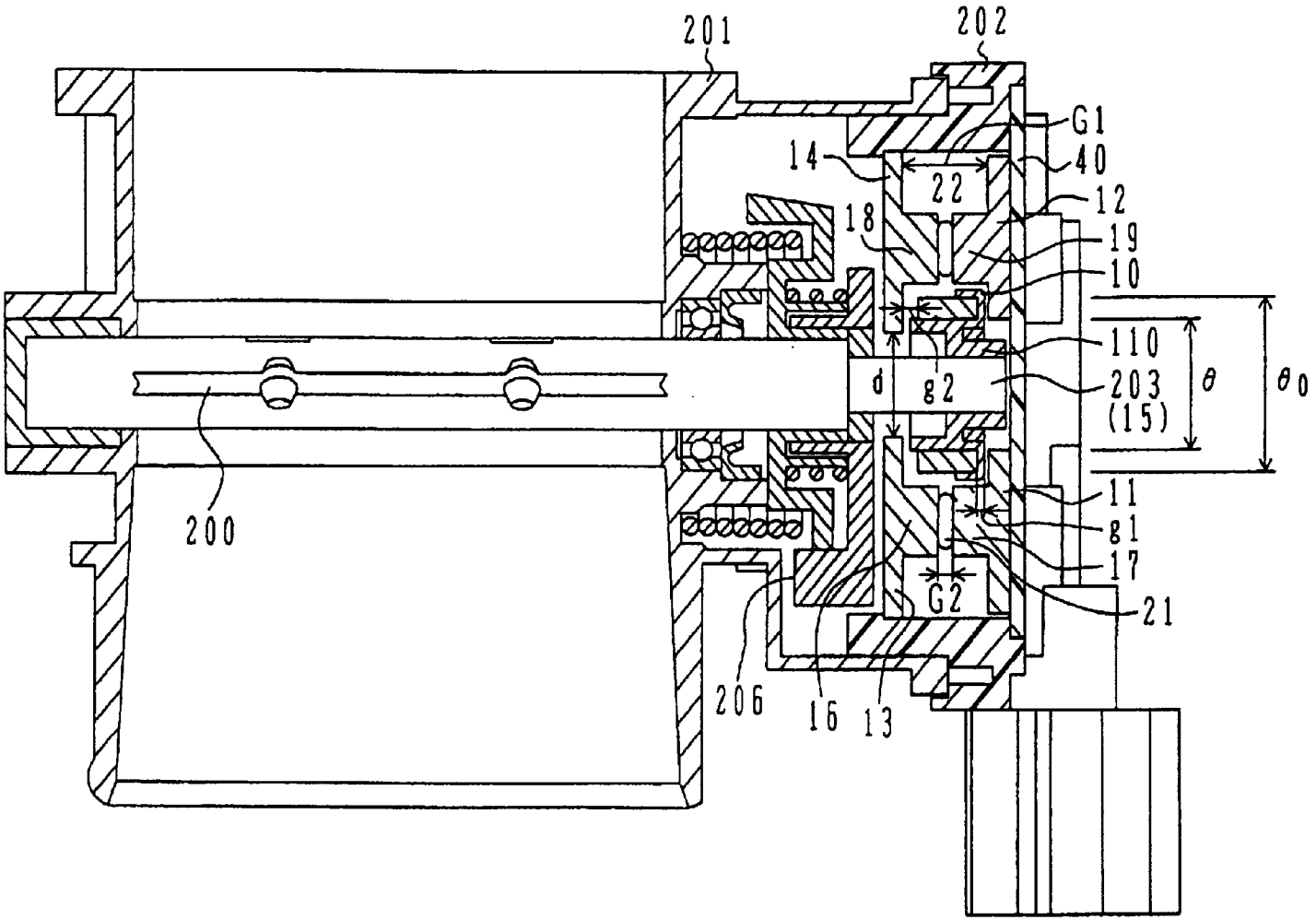
FIG. 19 is a conceptual view (showing components that have the same functions as actual ones, but are not exactly coincident in dimensions, shapes and positional relationship with the actual ones) taken along line X—X in FIG. 20.
Figure 20:
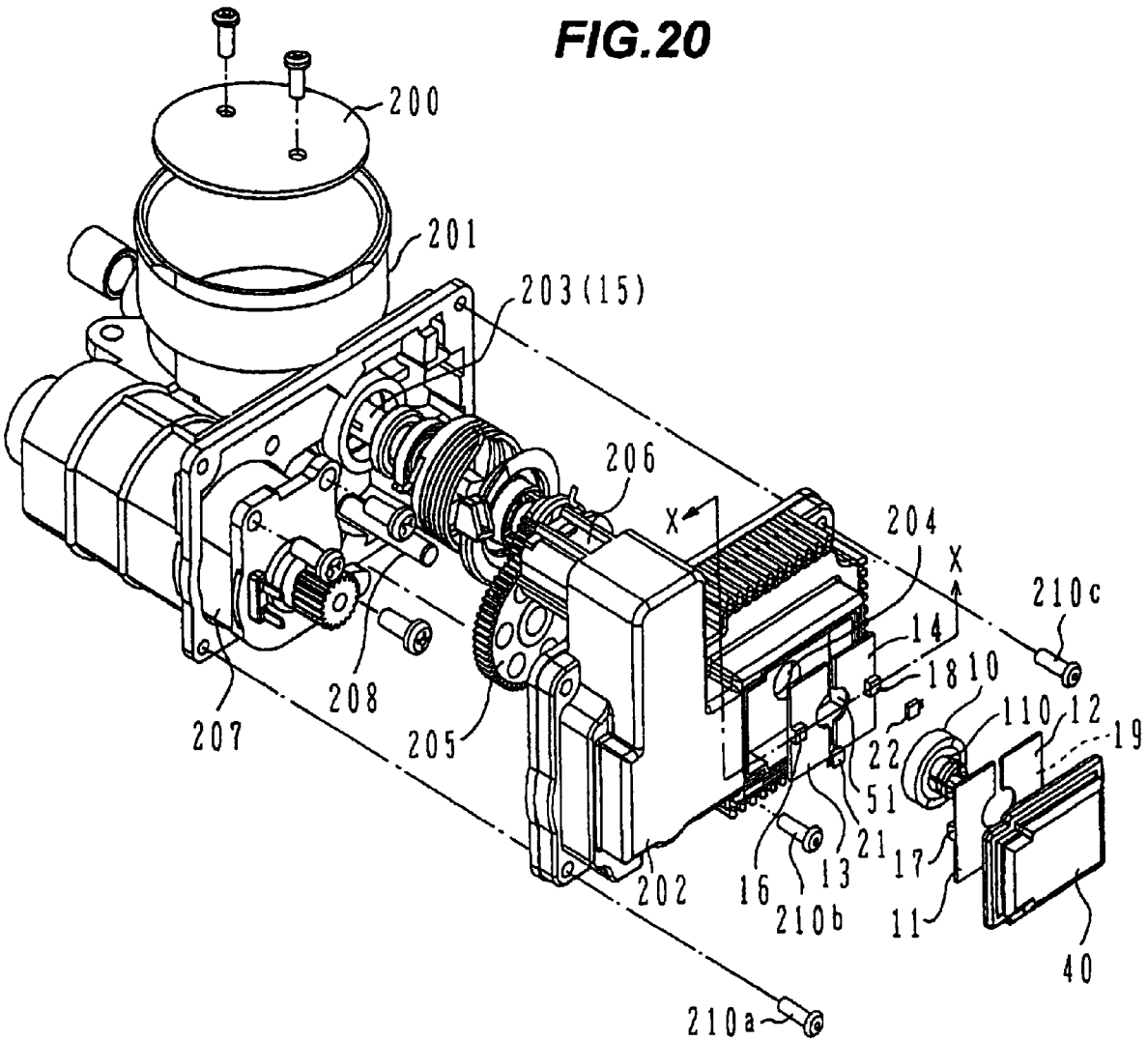
FIG. 20 is an exploded perspective view showing one embodiment of a throttle valve assembly to which the non-contact rotational position sensor of the present invention is attached.

One embodiment of a throttle valve assembly, to which the non-contact rotational position sensor of the present invention is attached, will be described below with reference to FIGS. 19 and 20.

A rotating shaft (rotating axis) 203 (corresponding to the shaft 15) is rotatably supported by a body 201. Numeral 200 denotes a throttle valve for controlling an opening area of an air passage formed in the body 201. The throttle valve 200 is fixed to the rotating shaft 203 by screws. Numeral 202 denotes a resin cover fixed to the body 201 by screws (210a-210c).

A through hole 204 is formed in the resin cover 202. A fore end of the rotating shaft 203 is extended to the outside of the resin cover 202 after passing the through hole 204.

A rectangular recess is formed in the resin cover 202 around the through hole 204. Magnetic plates 13, 14 having a hole 51 formed at the center thereof are stuck by bonding to an outer wall surface of the resin cover 202 which defines the rectangular recess. The magnetic plates 13, 14 are horizontally divided from each other, and air gaps similar to those (a1, a2, b1 and b2) shown in FIG. 1 are formed between the magnetic plates 13 and 14.

In a state of the resin cover 202 being attached to the body 201, the fore end of the rotating shaft 203 is extended to the outside beyond the magnetic plates 13, 14.

An annular or semi-annular magnet 10 is fixed to a resin-made attachment piece 110 having an attachment hole formed at the center, and the fore end of the rotating shaft 203 is fixed by press fitting to the central hole of the attachment piece 110.

With such an arrangement, the magnet 10 having an outer diameter greater than the diameter of the hole 51 formed at the center of the two magnetic plates 13, 14 can be attached to the fore end of the rotating shaft 203 on the outer side of the magnetic plates 13, 14.

Numeral 40 denotes a resin-made auxiliary cover for covering an area corresponding to the rectangular recess of the resin cover 202.

Inside the auxiliary cover 40, magnetic plates 11, 12 are bonded by an adhesive to positions to face the magnetic plates 13, 14, respectively. In a state where the auxiliary cover 40 is attached to the resin cover 202, a pair of gaps G2 are formed between the protruded magnetic substance portions 16, 18 provided on the magnetic plates 13, 14 and between the protruded magnetic substance portions 17, 19 provided on the magnetic plates 11, 12.

Hall devices 21, 22 as magnetic sensitive devices are disposed in the gaps G2.

Thus, the same non-contact rotational position sensor as shown in FIG. 1 to FIGS. 5A and 5B can be constructed at the fore end of the rotating shaft of the throttle valve.

In this embodiment, a motor 207 is mounted to the body 201, and a torque of the motor 207 is transmitted to the throttle valve rotating shaft 203 through an intermediate gear 205 and a final stage gear 206 fixed to the rotating shaft 203.

Numeral 208 denotes a stationary shaft for supporting the intermediate gear 205. In this embodiment, the intermediate gear 205 is made of a resin material and the final stage gear 206 is made of a sintered alloy. This material selection is advantageous in that electromagnetic noises generated by the motor 207 are absorbed by the final stage gear 20 made of a magnetic substance and hence can be avoided from adversely affecting a magnetic circuit of the sensor.

That effect can also be obtained by using a magnetic material to form the intermediate gear 205 and/or the stationary shaft 208 for supporting the intermediate gear 205.

Incidentally, when the final stage gear 206 is made of a magnetic material, it must be taken into consideration that the final stage gear 206 acts as part of the magnetic path of the leakage magnetic flux passing the rotating shaft.

Also, even when the final stage gear 206 is made of a resin material, a gear central portion is required to be made of a metal to provide a securing force sufficient to fix the final stage gear 206 onto the rotating shaft with certainty. When such a metal portion is made of a magnetic material, it likewise acts as part of the magnetic path of the leakage magnetic flux passing the rotating shaft of the magnet 10. Accordingly, a magnetic action of the metal portion must also be taken into consideration.

The diameter of the hole 51 formed at the center of the two magnetic plates 13, 14 or the gap between the magnetic material member on the final stage gear side and the magnetic plates 13, 14 must be set in consideration of the above-described points.

In this embodiment, the air gaps G2 between the magnet 10 and the magnetic plates 13, 14 are set to be smaller than any of the air gap between the magnetic plates 13, 14 and the rotating shaft 203 and the air gap between the magnetic plates and the magnetic material member on the side of the final stage gear 206 so that the leakage magnetic flux passing the rotating shaft 203 is minimized.

According to the present invention, the following advantages are achieved. Satisfactory performance of a non-contact rotational position sensor can be obtained while high flexibility in design is ensured, even when confronting surfaces of magnetic paths on the stator side and the rotor side are not shaped such that their lengths are even in a direction perpendicular to the rotor rotating direction. Also, since the magnetic flux can be effectively concentrated to positions where magnetic sensitive devices are attached, a non-contact rotational position sensor having high accuracy and high sensitivity can be obtained. Further, when a used permanent magnet is magnetized in the axial direction of a rotating axis, a sufficient level of detection sensitivity can be provided even with no magnetic material other than the permanent magnet being disposed on the rotor side. The inertial moment of the rotor is therefore reduced. As a result, the load of an actuator for rotating the rotor can be reduced, and hence a response of the rotor can be improved.

What is claimed is:

1. A non-contact rotational position sensor comprising:

a permanent magnet having a circular or arc-shaped outer circumference;

a shaft for supporting and fixing said permanent magnet;

upper and lower magnetic plates sandwiching said permanent magnet from above and below, at least one of said upper and lower magnetic plates being horizontally separated from each other with an air gap formed therebetween;

[at least one protruded magnetic substance portion disposed between said upper and lower magnetic plates; and]

a magnetic sensitive device disposed on a protruded surface of [said] *a* protruded magnetic substance portion, said permanent magnet and said shaft constituting a rotor which is rotatable relative to said upper and lower magnetic plates vertically spaced from each other, said permanent [magnetic] *magnet* being magnetized substantially in the direction of a rotating axis, whereby the amount of magnetic flux passing said magnetic sensitive device is varied with rotation of said permanent magnet, wherein said upper and lower magnetic plates sandwiching said permanent magnet from above and below are [formed of] magnetic plates each having protruded portions at opposite ends [instead of providing said protruded magnetic substance portion on at least one of said upper and lower magnetic plates], said protruded portions being bent to [form pairs of] *comprise* upper and lower [protruded portions] *pairs*, and said magnetic sensitive device is [inserted] *arranged* in an air gap formed between [protruded] surfaces of every two *of said* upper and lower *pairs of* protruded portions[.]*;*

*said upper magnetic plate is comprised of a first upper magnetic plate and a second upper magnetic plate; said lower magnetic plate is comprised of a first lower magnetic plate and a second lower magnetic plate; said permanent magnet consists of two permanent magnets, in which the first of the permanent magnets is magnetized in one direction, and the second of the permanent magnets is magnetized in a direction opposite to the one direction; a first area in which the magnetic field of the first permanent magnet has the one direction and a first area in which magnetic field of the second permanent magnet has the opposite direction being positioned between said first upper magnetic plate and said first lower magnetic plate; and a second area in which the magnetic field of the first permanent magnet has the one direction and a second area in which the magnetic field of the second permanent magnet has the opposite direction being positioned between said second upper magnetic plate and said second lower magnetic plate;*

*whereby the first upper magnetic plate and the first lower magnetic plate thus form a linear magnetic circuit between the permanent magnet and the protruded magnetic substance portion independent of a rotating position of said permanent magnet, and the second upper magnetic plate and said second lower magnetic plate thus form a linear magnetic circuit between said permanent magnet and the protruded magnetic substance portion independent of the rotating position of the permanent magnet.*

2. A non-contact rotational position sensor comprising:

a rotating axis;

an annular or semi-annular magnet fixed to said rotating axis;

magnetic substance assemblies arranged in opposing relation to sandwich said magnet therebetween with a spacing greater than a thickness of said magnet left between said magnetic substance assemblies in [the] *an* axial direction of said rotating axis, such that a uniform air gap is formed between said magnet and a surface of each of said magnetic substance assemblies [confronting] *facing* said magnet;

a pair of small air gaps [formed in] *defined by* said magnetic substance assemblies and being smaller than said *uniform* air gap; and a magnetic sensitive device disposed in *each* said small air gap, wherein said magnetic substance assemblies comprise a pair of rectangularly-shaped magnetic plates, and at least one of said pair of rectangular magnetic plates [has a split] *is divided by a separating* air gap [formed along an imaginary plane] passing [an axial center line of] *through* said rotating axis[, said air gap splitting said rectangular magnetic plate into two parts]*; the at least one pair of magnetic plates comprising upper and lower magnetic plates in which the upper magnetic plate is comprised of a first upper magnetic plate and a second upper magnetic plate, the lower magnetic plate is comprised of a first lower magnetic plate and a second lower magnetic plate, the magnet is comprised of two magnets with the first of the being magnetized in one direction, and the second of the magnets being magnetized in a direction opposite to the one direction; a first area in which a magnetic field of the first magnet has the one direction and a first area in which a magnetic field of the second magnet has the opposite direction being positioned between first upper magnetic plate and the first lower magnetic plate; and a second area in which the magnetic field of the first magnet has the one direction and a second area in which the magnetic field of the second magnet has the opposite direction being positioned between second upper magnetic plate and the second lower magnetic plate; whereby the*

*first upper magnetic plate and the first lower magnetic plate thus form a linear magnetic circuit between the magnet and the protruded magnetic substance portion independent of the rotational position of the magnet, and the second upper magnetic plate and the second lower magnetic plate thus form a linear magnetic circuit between said magnet and a protruded magnetic substance portion independent of the rotational position of the magnet.*

3. A non-contact rotational position sensor comprising:

a rotating axis;

an annular or semi-annular magnet fixed to said rotating axis;

magnetic substance assemblies arranged in opposing relation to sandwich said magnet therebetween with a spacing greater than a thickness of said magnet [left] *arranged* between said magnetic substance assemblies in [the] *an* axial direction of said rotating axis, such that a uniform air gap is formed between said magnet and a surface of each of said magnetic substance assemblies [confronting] *facing* said magnet;

a pair of small air gaps [formed in] *defined by* said magnetic substance assemblies and being smaller than said *uniform* air gap; and a magnetic sensitive device disposed in *each* said small air gap, wherein said pair of small air gaps are formed in symmetrical positions with respect to said rotating axis situated therebetween*, the at least one pair of magnetic plates comprising upper and lower magnetic plates in which the upper magnetic plate is comprised of a first upper magnetic plate and a second upper magnetic plate, the lower magnetic plate is comprised of a first lower magnetic plate and a second lower magnetic plate, the magnet is comprised of two magnets with the first of the being magnetized in one direction, and the second of the magnets being magnetized in a direction opposite to the one direction; a first area in which a magnetic field of the first magnet has the one direction and a first area in which a magnetic field of the second magnet has the opposite direction being positioned between first upper magnetic plate and the first lower magnetic plate; and a second area in which the magnetic field of the first magnet has the one direction and a second area in which the magnetic field of the second magnet has the opposite direction being positioned between second upper magnetic plate and the second lower magnetic plate; whereby the first upper magnetic plate and the first lower magnetic plate thus form a linear magnetic circuit between the magnet and the protruded magnetic substance portion independent of the rotational position of the magnet, and the second upper magnetic plate and the second lower magnetic plate thus form a linear magnetic circuit between said magnet and a protruded magnetic substance portion independent of the rotational position of the magnet.*

4. A non-contact rotational position sensor according to claim 3, wherein said pair of small air gaps are each formed between confronting surfaces of a pair of protrusions protruded from said magnetic [plate] *substance* assemblies in directions in which said protrusions come closer to each other.

5. A throttle valve assembly comprising:

an annular or semi-annular magnet attached to one end of a throttle valve;

a resin cover attached to a body in which said throttle valve is mounted;

an auxiliary [caver] *cover* attached to said resin cover;

magnetic path forming members attached to said resin cover and said auxiliary cover, respectively, and forming magnetic paths with said annular or semi-annular magnet situated therebetween;

a magnetic flux converging portion formed in each of said magnetic paths and concentrating a magnetic flux passing said magnetic path to a [particular] *predetermined* position; and a magnetic sensitive device attached to said magnetic flux converging portion and detecting change of the magnetic flux in said magnetic flux converging portion caused upon rotation of said throttle valve*, the magnetic path members comprising upper and lower magnetic plates in which the upper magnetic plate is comprised of a first upper magnetic plate and a second upper magnetic plate, the lower magnetic plate is comprised of a first lower magnetic plate and a second lower magnetic plate, the magnet is comprised of two magnets with the first of the being magnetized in one direction, and the second of the magnets being magnetized in a direction opposite to the one direction; a first area in which a magnetic field of the first magnet has the one direction and a first area in which a magnetic field of the second magnet has the opposite direction being positioned between first upper magnetic plate and the first lower magnetic plate; and a second area in which the magnetic field of the first magnet has the one direction and a second area in which the magnetic field of the second magnet has the opposite direction being positioned between second upper magnetic plate and the second lower magnetic plate; whereby the first upper magnetic plate and the first lower magnetic plate thus form a linear magnetic circuit between the magnet and the protruded magnetic substance portion independent of the rotational position of the magnet, and the second upper magnetic plate and the second lower magnetic plate form a linear magnetic circuit between said magnet and a protruded magnetic substance portion independent of the rotational position of the magnet.*

6. A throttle valve assembly according to claim 5, further comprising:

a motor for driving said throttle valve; and a magnetic substance arranged between said motor and said magnetic paths.

7. A throttle valve assembly according to claim 6, wherein said magnetic substance is in the form of a gear for transmitting rotation of said motor to a rotating shaft of said throttle valve, or in the form of a rotating shaft of said gear.

8. A throttle valve assembly according to claim 5, wherein said resin cover has a hole for insertion of a rotating shaft provided with said throttle valve fitted thereon;

said magnetic path forming member attached to the side of said resin cover has a hole formed at the center thereof and having a diameter greater than a diameter of said rotating shaft, but smaller than a diameter of said annular or semi-annular magnet; and said annular or semi-annular magnet is detachably attached to an end of said rotating shaft inserted through said hole in said magnetic path forming member.

*9. A non-contact rotational position sensor comprising:*

*two permanent magnets having a circular or arc-shaped outer circumference;*

*a shaft for supporting and fixing said permanent magnet;*

*upper and lower magnetic plates sandwiching said permanent magnet from above and below, at least one of said upper and lower magnetic plates being horizontally separated from each other with an air gap formed therebetween;*

*at least one protruded magnetic substance portion disposed between said upper and lower magnetic plates; and*

*a magnetic sensitive device disposed on a protruded surface of said protruded magnetic substance portion,*

*said permanent magnet and said shaft constituting a rotor which is rotatable relative to said upper and lower magnetic plates vertically spaced from each other,*

*said permanent magnet being magnetized substantially in the direction of a rotating axis, whereby the amount of magnetic flux passing said magnetic sensitive device is varied with rotation of said permanent magnet, said upper magnetic plate is comprised of a first upper magnetic plate and a second upper magnetic plate; said lower magnetic plate is comprised of a first lower magnetic plate and a second lower magnetic plate; the first of the permanent magnets being magnetized in one direction and the second of the permanent magnets being magnetized in a direction opposite to the one direction; a first area in which a magnetic field of the first permanent magnet has the one direction and a first area in which a magnetic field of the second permanent magnet has the opposite direction being positioned between said first upper magnetic plate and said first lower magnetic plate; and a second area in which the magnetic field of the first permanent magnet has the one direction and a second area in which the magnetic field of the second permanent magnet has the opposite direction being positioned between said second upper magnetic plate and said second lower magnetic plate; whereby the first upper magnetic plate and the first lower magnetic plate thus form a linear magnetic circuit between the permanent magnet and the protruded magnetic substance portion independent of a rotating position of said permanent magnet, and the second upper magnetic plate and said second lower magnetic plate thus form a linear magnetic circuit between said permanent magnet and the protruded magnetic substance portion independent of the rotating position of the permanent magnet.*

*10. A non-contact rotational position sensor according to claim 9, wherein said permanent magnet is in the form of a ring.*

*11. A non-contact rotational position sensor according to claim 9, wherein said permanent magnet is in the form of an arc having a certain width in the radial direction.*

*12. A non-contact rotational position sensor according to claim 9, wherein said permanent magnet is in the form of a disk.*

*13. A non-contact rotational position sensor according to claim 9, wherein each of air gaps between said permanent magnet and said upper and lower magnetic plates has a width of not less than 0.5 mm.*

*14. A non-contact rotational position sensor according to claim 9, wherein the magnetic flux density in at least the magnetic plates is not higher than 0.5 T.*

*15. A non-contact rotational position sensor according to claim 9, wherein said magnetic sensitive device is a Hall device or a Hall IC.*

*16. A non-contact rotational position sensor according to claim 9, wherein said magnetic plate and a member for fixing said magnetic plate are comprise a one-piece resin-molded unit.*

*17. A non-contact rotational position sensor according to claim 9, wherein at least one hole is formed in said magnetic plate near said protruded magnetic substance portion.*

*18. A non-contact rotational position sensor comprising:*

*a permanent magnet having a circular or arc-shaped outer circumference;*

*a shaft for supporting and fixing said permanent magnet;*

*magnetic plates sandwiching said permanent magnet from opposite outer sides in the radial direction;*

*a magnetic circuit having a portion for converging a magnetic flux generated from said permanent magnet;*

*an air gap formed at a fore end of the magnetic flux converging portion of said magnetic circuit; and*

*a magnetic sensitive device disposed in said air gap,*

*said permanent magnet and said shaft constituting a rotor which is rotatable relative to said magnetic plates arranged outwardly of said permanent magnet in the radial direction,*

*said permanent magnet being magnetized substantially in the radial direction, whereby the amount of magnetic flux passing said magnetic sensitive device is varied with rotation of said permanent magnet the at least one pair of magnetic plates comprising upper and lower magnetic plates in which the upper magnetic plate is comprised of a first upper magnetic plate and a second upper magnetic plate, the lower magnetic plate is comprised of a first lower magnetic plate and a second lower magnetic plate, the magnet is comprised of two magnets with the first of the being magnetized in one direction and the second of the magnets being magnetized in a direction opposite to the one direction; a first area in which a magnetic field of the first magnet has the one direction and a first area in which a magnetic field of the second magnet has the opposite direction being positioned between first upper magnetic plate and the first lower magnetic plate; and a second area in which the magnetic field of the first magnet has the one direction and a second area in which the magnetic field of the second magnet has the opposite direction being positioned between second upper magnetic plate and the second lower magnetic plate; whereby the first upper magnetic plate and the first lower magnetic plate thus form a linear magnetic circuit between the magnet and the protruded magnetic substance portion independent of the rotational position of the magnet, and the second upper magnetic plate and the second lower magnetic plate thus form a linear magnetic circuit between said magnet and a protruded magnetic substance portion independent of the rotational position of the magnet.*

*19. A non-contact rotational position sensor comprising:*

*a rotating axis;*

*an annular or semi-annular magnet fixed to said rotating axis;*

*magnetic substance assemblies arranged in opposing relation to sandwich said magnet therebetween with a spacing greater than a thickness of said magnet left between said magnetic substance assemblies in an axial direction of said rotating axis, such that a uniform air gap is defined between said magnet and a surface of each of said magnetic substance assemblies confronting said magnet;*

*a pair of small air gaps defined between said magnetic substance assemblies and being smaller than said uniform air gap; and*

*a magnetic sensitive device disposed in said small air gap, the magnetic substance assemblies comprising upper and lower magnetic plates in which the upper magnetic plate is comprised of a first upper magnetic plate and a second upper magnetic plate, the lower magnetic plate is comprised of a first lower magnetic plate and a second lower magnetic plate, the magnet is comprised of two magnets with the first of the being magnetized in one direction and the second of the magnets being magnetized in a direction opposite to the one direction; a first area in which a magnetic field of the first magnet has the one direction and a first area in which a magnetic field of the second magnet has the opposite direction being positioned between first upper magnetic plate and the first lower magnetic plate; and a second area in which the magnetic field of the first magnet has the one direction and a second area in which the magnetic field of the second magnet has the opposite direction being positioned between second upper magnetic plate and the second lower magnetic plate; whereby the first upper magnetic plate and the first lower magnetic plate thus form a linear magnetic circuit between the magnet and the protruded magnetic substance portion independent of the rotational position of the magnet, and the second upper magnetic plate and the second lower magnetic plate thus form a linear magnetic circuit between said magnet and a protruded magnetic substance portion independent of the rotational position of the magnet.*

*20. A non-contact rotational position sensor according to claim 19, wherein said pair of magnetic plates are each rectangular in shape.*

*21. A non-contact rotational position sensor according to claim 19, wherein:*

*at least one of said pair of magnetic plates has a split air gap formed along an imaginary plane passing an axial center line of said rotating axis, said air gap splitting said magnetic plate into two parts; and*

*said pair of small air gaps are formed in symmetrical positions with respect to said split air gap situated therebetween.*

* * * * *